US011088913B2

(12) United States Patent
Washenko

(10) Patent No.: US 11,088,913 B2
(45) Date of Patent: Aug. 10, 2021

(54) SYSTEMS AND METHODS FOR NETWORK DEVICE CONFIGURATION DEPLOYMENT

(71) Applicant: MasterCard International Incorporated, Purchase, NY (US)

(72) Inventor: Michael G. Washenko, Maryville, IL (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 222 days.

(21) Appl. No.: 15/651,984

(22) Filed: Jul. 17, 2017

(65) Prior Publication Data
US 2019/0020545 A1 Jan. 17, 2019

(51) Int. Cl.
*H04L 12/24* (2006.01)
*H04L 29/08* (2006.01)

(52) U.S. Cl.
CPC ......... *H04L 41/0883* (2013.01); *H04L 41/22* (2013.01); *H04L 67/34* (2013.01)

(58) Field of Classification Search
None
See application file for complete search history.

(56) References Cited

U.S. PATENT DOCUMENTS

| 9,854,391 | B2* | 12/2017 | PalChaudhuri | H04L 41/0809 |
| 2002/0049693 | A1 | 4/2002 | Gase | |
| 2006/0212547 | A1 | 9/2006 | Deleu et al. | |
| 2007/0268516 | A1 | 11/2007 | Bugwadia et al. | |
| 2009/0287913 | A1 | 11/2009 | Woods et al. | |
| 2014/0298007 | A1* | 10/2014 | Rukmangathan | H04L 63/0876 713/153 |
| 2015/0220233 | A1* | 8/2015 | Kok | G06F 17/243 715/222 |
| 2016/0127176 | A1* | 5/2016 | Edara | H04L 41/0806 455/558 |
| 2017/0257439 | A1* | 9/2017 | Wang | H04L 12/4641 |
| 2019/0114183 | A1* | 4/2019 | Chen | G06F 9/44505 |

* cited by examiner

*Primary Examiner* — Angela Nguyen
(74) *Attorney, Agent, or Firm* — Armstrong Teasdale LLP

(57) ABSTRACT

A network configuration (NC) computing device is provided. The NC computing device includes a processor in communication with a memory. The processor is configured to receive a command to initiate a configuration of a network device and present a questionnaire to a user about the network device. The questionnaire includes a plurality of questions about potential configurations of a network device. The processor is also configured to receive a plurality of responses from the user based on the questionnaire, generate a primary configuration file based on the plurality of responses, and transmit the primary configuration file to an installer device associated with the network device. The installer device is configured to install the primary configuration file on the network device.

20 Claims, 8 Drawing Sheets

SYSTEMS AND METHODS FOR NETWORK DEVICE CONFIGURATION DEPLOYMENT

BACKGROUND OF THE DISCLOSURE

The field of the disclosure relates generally to deploying network devices, and more specifically to methods and systems for remotely configuring network devices for deployment and integration into networks.

To access a wide area network (WAN), a series of network routers and switches (collectively referred to herein as "network devices") are used to connect user computing devices and host computing devices to the WAN. To form the WAN, these network devices are typically purchased from a vendor and are deployed in communication with each other and other devices that are accessing the network. Examples of WANs include, but are not limited to, the Internet, company networks, payment processing networks, and home networks. The network devices are generally purchased with a default configuration. The network devices may require manual configuration from the default configuration to ensure the connectivity, security, and other requirements of the network provider are met by the network devices. Some known networks require multiple or unique configurations that may involve complex and long installation processes, which may cause a delayed deployment of the networks. Moreover, network infrastructure configuration is generally performed by a limited number of trained individuals. If the installation process includes more routers and switches than the trained individuals have capacity to configure in a timely manner, the deployment of the network may be even further delayed. Furthermore, if the trained individuals are required to travel to locations where network devices are being deployed the costs of deployment are greatly increased.

BRIEF DESCRIPTION OF THE DISCLOSURE

In one aspect, a network configuration (NC) computing device is provided. The NC computing device includes a processor in communication with a memory. The processor is configured to receive a command to initiate an configuration of a network device and present a questionnaire to a user about the network device. The questionnaire includes a plurality of questions about potential configurations of the network device. The processor is also configured to receive a plurality of responses from the user based on the questionnaire, generate a primary configuration file based on the plurality of responses, and transmit the primary configuration file to an installer device associated with the network device. The installer device is configured to install the primary configuration file on the network device.

In another aspect, a computer-based method for configuring network devices is provided. The method is implemented using a network configuration (NC) computer device in communication with a memory. The method includes receiving, at the NC computer device, a command to initiate a configuration of a network device and presenting, by the NC computer device, a questionnaire to a user about the network device. The questionnaire includes a plurality of questions about potential configurations of the network device. The method also includes receiving, at the NC computer device, a plurality of responses from the user based on the questionnaire, generating, by the NC computer device, a primary configuration file based on the plurality of responses, and transmitting, by the NC computer device, the primary configuration file to an installer device associated with the network device. The installer device is configured to install the primary configuration file on the network device.

In yet another aspect, at least one non-transitory computer-readable storage media having computer-executable instructions embodied thereon is provided. When executed by a network configuration (NC) computer device having at least one processor coupled to at least one memory device, the computer-executable instructions cause the processor to receive a command to initiate a configuration of a network device and present a questionnaire to a user about the network device. The questionnaire includes a plurality of questions about potential configurations of the network device. The computer-executable instructions also cause the processor to receive a plurality of responses from the user based on the questionnaire, generate a primary configuration file based on the plurality of responses, and transmit the primary configuration file to an installer device associated with the network device, wherein the installer device is configured to install the primary configuration file on the network device.

BRIEF DESCRIPTION OF THE DRAWINGS

FIG. 1 is a schematic diagram illustrating an example multi-location wide area network (WAN).

FIG. 2 is a simplified block diagram of an example network configuration computer device used for configuring one or more network devices for integration in to the multi-location wide area network shown in FIG. 1.

FIG. 3 illustrates an example configuration of a client system shown in FIG. 2, in accordance with one embodiment of the present disclosure.

FIG. 4 illustrates an example configuration of a server system shown in FIG. 2, in accordance with one embodiment of the present disclosure.

FIG. 5 is a flow chart of a process for configuring one or more network devices for integration into a network using the system shown in FIG. 2.

FIG. 6 is a diagram of components of one or more example computing devices that may be used in the system shown in FIG. 2.

FIG. 7 is a schematic diagram illustrating an example dual router network for the WAN shown in FIG. 1.

FIG. 8 is a schematic diagram illustrating an example single router network for the WAN shown in FIG. 1.

DETAILED DESCRIPTION OF THE DISCLOSURE

Figure 1:
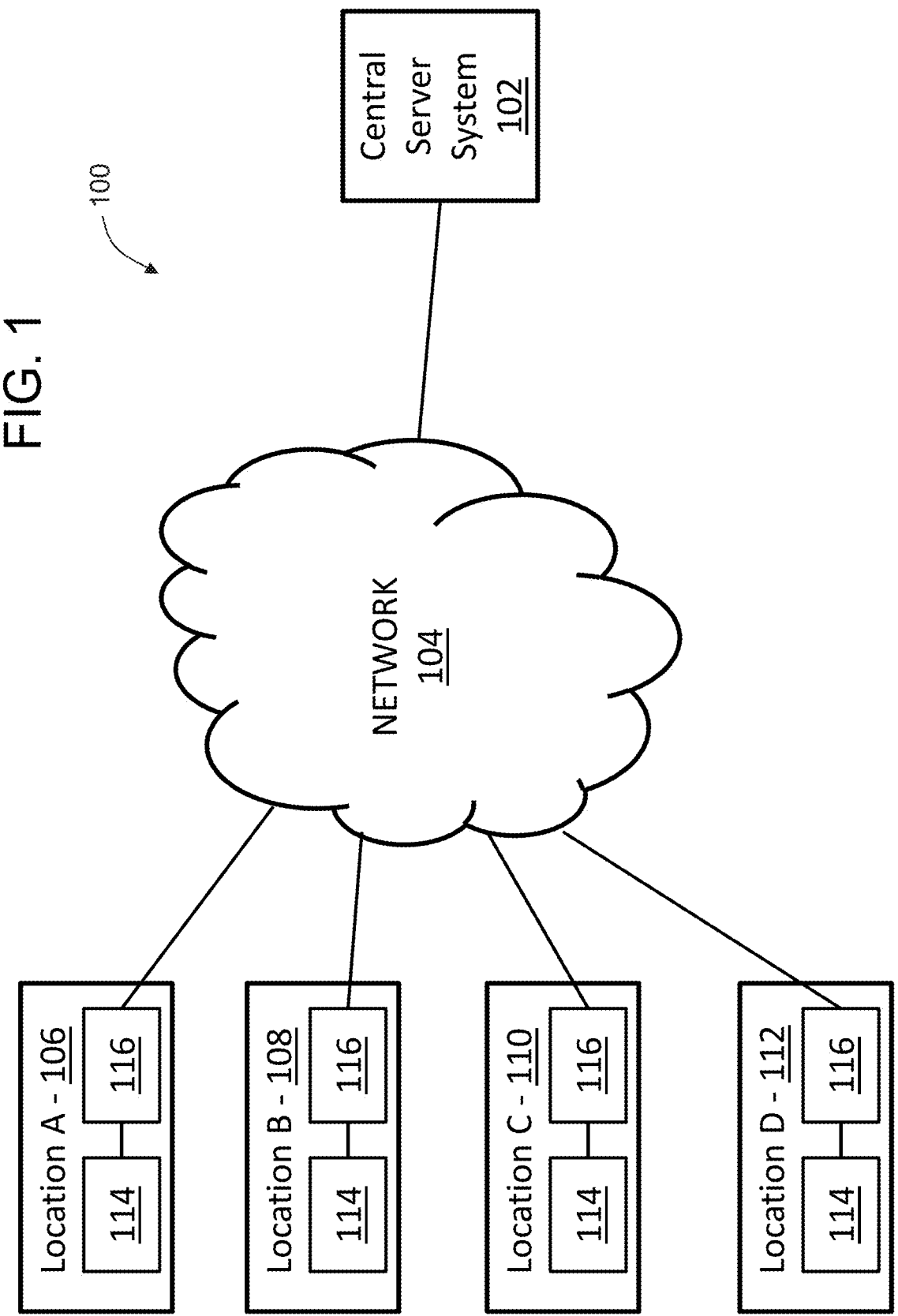
FIGS. 1-8 show example embodiments of the methods and systems described herein.

The following detailed description illustrates embodiments of the disclosure by way of example and not by way of limitation. The description clearly enables one skilled in the art to make and use the disclosure, and describes several embodiments, adaptations, variations, alternatives, and uses of the disclosure, including what is presently believed to be the best mode of carrying out the disclosure, of the system and methods to configure one or more network devices for integration in to the multi-location wide area network.

In the example embodiment, a network configuration (NC) computer device receives a command to initiate a configuration of an unconfigured network device. In some embodiments, the network device is configured for a first network and will be reconfigured for a second network. In the example embodiment, the NC computer device receives the command from a user.

In the example embodiment, the NC computer device presents a questionnaire to the user about the unconfigured network device. The questionnaire includes a plurality of questions about the potential configuration of network device. In the example embodiment, the questions are more targeted to general information about the network that network device will be a part of as it relates to the final location where unconfigured network device will operate as a network device. Examples of questions include, but are not limited to, the final location for unconfigured network device, the type of device, which router of a plurality of routers the device will be at the final location, the network access provider, transport type, any addressing prefixes, bandwidth, VPN tunnel address, session description protocol (SDP), and other necessary network information. The purpose is to have the questions in the questionnaire be high level, so that the user does not have to be highly trained to answer the questionnaire. The NC computer device receives a plurality of responses from the user based on the questions in the questionnaire.

The final location may include location within a network, whether or not the device will be a gateway, actual address of the final location of the device, physical location within a building, and any other location that will assist the NC computer device in determining the desired configuration for the device. The type of device may include, but is not limited to, the manufacturer, the make, the model, whether the device is a single or double router, the firmware version of the device, and any other information that allows the NC computer device to identify the device from other similar devices. The questions may request the user to choose the position of the device in the network from a plurality of choices. The network access provider may include the vendor that will be providing network access to the computer network that the device will be connected to, such as, but not limited to, an Internet access provider. Examples of transport type include, but are not limited to T1, E1, point-to-point protocol (PPP), Ethernet, asynchronous transport mode (ATM), frame-relay, and very small aperture terminal (VSAT).

Based on the plurality of responses, the NC computer device generates a primary configuration file. The NC computer device then transmits the primary configuration file to an installer device. The installer device is configured to use the primary configuration file to configure unconfigured network device into a configured network device ready to be used in the network.

In some embodiments, the NC computer device transmits part or all of the primary configuration file to a central server system. This transmission includes identification information for the network device. The central server system uses the primary configuration file to determine how to route message traffic to the network device. For example, the central server system determines the bandwidth of the network device and routes network traffic accordingly to prevent overloading the network device.

In some embodiments, the NC computer device stores a plurality of configuration information for a plurality of different network devices at a plurality of different locations. The plurality of configuration information includes a plurality of options for network devices as well as network standard rules associated with the network or the locations. The NC computer device compares the plurality of responses to the questionnaire and the stored plurality of configuration information. The NC computer device generates the primary configuration file based on the comparison. In the example embodiment, the primary configuration file only includes a subset of the plurality of configuration information, where the subset is based on the configuration information necessary to set up an individual unconfigured network device.

In some embodiments, the plurality of configuration information is configured in a network configuration template, where the NC computer device converts the network configuration template into the primary configuration file based on the responses to the questionnaire. For example, the NC computer device may execute a script or program to present the questionnaire to the user. As the NC computer device receives the response from the user, the NC computer device generates the primary configuration file.

In some embodiments, the NC computer device generates a secondary configuration file, where the secondary configuration file is an encryption configuration for the network device. The NC computer device transmits the secondary configuration file to the installer device to use to configure the unconfigured network device.

In some embodiments, the NC computer device is configured to generate a plurality of related primary configuration files for a plurality of unconfigured network devices. In some of these embodiments, the NC computer device presents a questionnaire for each network device. In other embodiments, the NC computer device presents a single questionnaire for the plurality of network devices. In these embodiments, the NC computer device transmits the primary configuration file associated with a network device to the corresponding installer device, where each installer device may only be associated with a subset of the plurality of network devices.

The methods and system described herein may be implemented using computer programming or engineering techniques including computer software, firmware, hardware, or any combination or subset. As disclosed above, at least one technical problem with prior systems is that there is a need for systems for consistently configuring network devices without requiring highly trained individuals to configure the devices. The system and methods described herein address that technical problem. The technical effect of the systems and processes described herein is achieved by performing at least one of the following steps: (a) receiving a command to initiate a configuration of a network device, where the network device includes at least one of a router and a network switch; (b) storing a plurality of configuration information for a plurality of network devices, where the plurality of configuration information includes a plurality of options, a plurality of network standard rules, and a network configuration template; (c) presenting a questionnaire to a user about the network device, where the questionnaire includes a plurality of questions about potential configurations of the network device; (d) receiving a plurality of responses from the user based on the questionnaire; (e) comparing the plurality of response to the plurality of configuration information to determine the appropriate configuration for the network device; (f) applying the plurality of responses to the questionnaire to the template to generate the primary configuration file, where the primary configuration file includes a subset of the information included in the network configuration template; (g) generating a primary configuration file based on the plurality of responses and the stored plurality of configuration information; (h) transmitting the primary configuration file to an installer device associated with the network device, where the installer device is configured to install the primary configuration file on the network device; (i) transmitting the primary configuration file to a central server system including identification information for the network device corresponding to the primary configuration file, where the central server system is configured to transmit message traffic to the network device based on the primary configuration file; and (j) generating a secondary configuration file for the corresponding network device based on the primary configuration file, where the secondary configuration file includes an encryption configuration. The resulting technical effect is consistently configuring network devices to work with networks without requiring highly trained personnel setting up each network device.

In one embodiment, a computer program is provided, and the program is embodied on a computer-readable medium. In an example embodiment, the system is executed on a single computer system, without requiring a connection to a server computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, Calif.). In yet a further embodiment, the system is run on a Mac OS® environment (Mac OS is a registered trademark of Apple Inc. located in Cupertino, Calif.). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In one embodiment, a computer program is provided, and the program is embodied on a computer-readable medium and utilizes a Structured Query Language (SQL) with a client user interface front-end for administration and a web interface for standard user input and reports. In another embodiment, the system is web enabled and is run on a business entity intranet. In yet another embodiment, the system is fully accessed by individuals having an authorized access outside the firewall of the business-entity through the Internet. In a further embodiment, the system is being run in a Windows® environment (Windows is a registered trademark of Microsoft Corporation, Redmond, Wash.). The application is flexible and designed to run in various different environments without compromising any major functionality.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the system and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

FIG. 1 is a schematic diagram illustrating an example multi-location wide area network (WAN) 100. WAN includes a connection between a central server system 102 and computers 114 at a plurality of locations 106, 108, 110, and 112. Central server system 102 communicates with computers 114 at plurality of locations 106, 108, 110, and 112 through a network 104. In the example embodiment, network 104 is a wide area network, such as the Internet. In other embodiments, network 104 is a company network, a payment processing network, home network, or any other wide area network where computers communicate with each other.

Each of plurality of locations 106, 108, 110, and 112 communicates to network through a network device 116. Examples of network device 116 include, but are not limited to, routers, cable modems, modems, hubs, and network switches. Network devices 116 route network traffic from network to computers 114 at each location 106, 108, 110, and 112, and vice versa. Different network devices 116 may be of different types and different capabilities. Network devices 116 at different locations 106, 108, 110, and 112 may have different connection types to network 104, which therefore provide communication with network 104 at different speeds and/or bandwidths. To communicate with network 104 properly and efficiently each network device 116 needs to be properly configured.

In the example embodiment, location A 106 is in a different geographic municipality as location B 108. Location A 106 is in a different geographic state or province as location C 110. And location A 106 is in a different geographic nation as location D 112. In other embodiments, one or more locations 106, 108, 110, and 112 may be within the same city or even the same building.

Central server system 102 communicates with computers 114 at each location 106, 108, 110, and 112. In the example embodiment, central server system 102 includes a database, such as database 220 shown in FIG. 2, that includes the configuration and capabilities of each network device 116 at each location 106, 108, 110, and 112. With this information, central server system 102 is able to configure its communication and message traffic with each network device 116 efficiently to use the capabilities of each network device 116 to the maximum efficiency possible.

Figure 2:
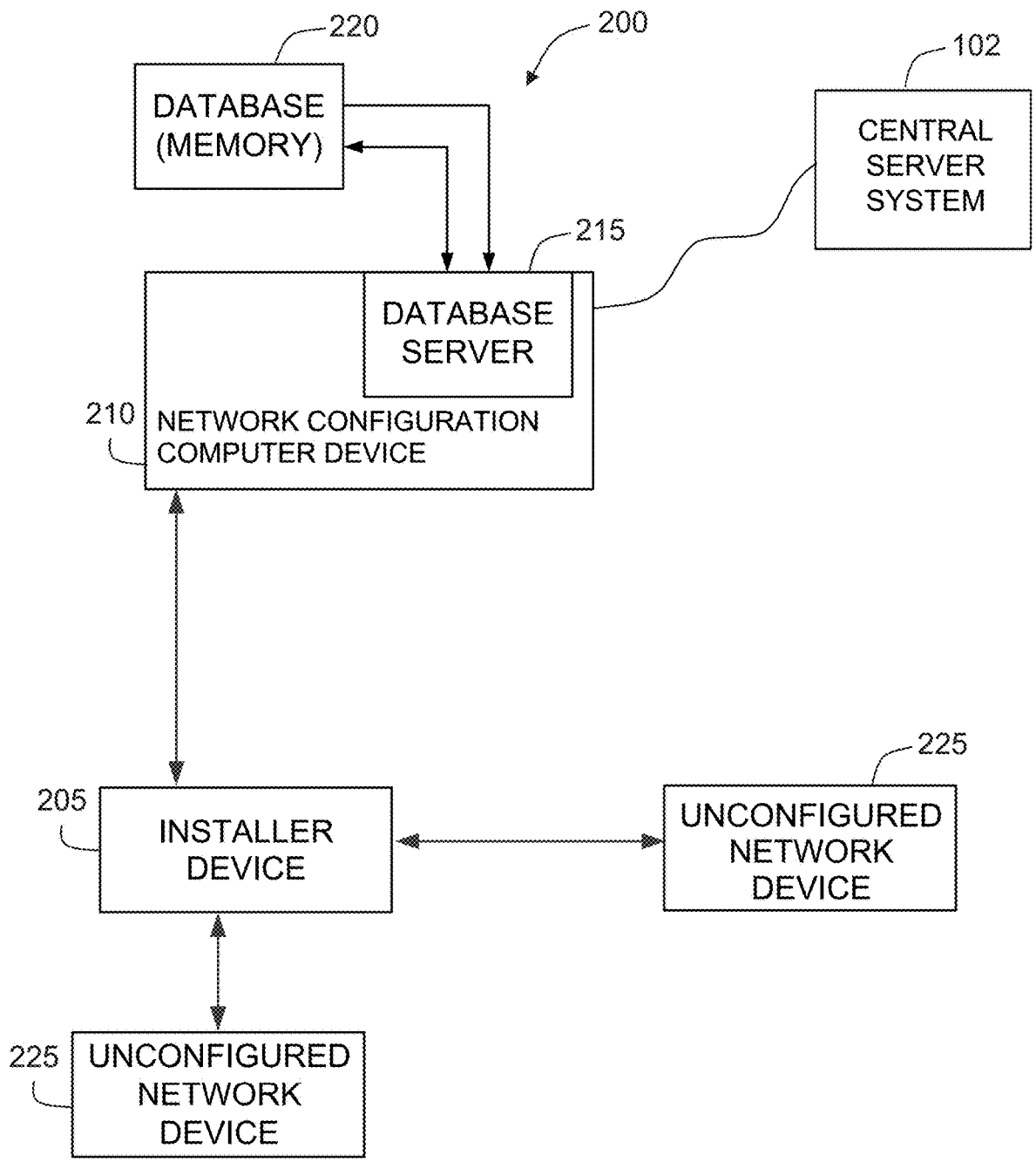

FIG. 2 is a simplified block diagram of an example network configuration system 200 used for configuring one or more network devices 116 for integration in to the multi-location wide area network 100 shown in FIG. 1. In the example embodiment, network configuration system 200 includes a network configuration (NC) computer device 210 configured to configure one or more network devices 116 for integration into multi-location wide area network 100. As described below in more detail, NC computer device 210 is configured to receive a command to initiate a configuration of a network device 225, present a questionnaire to a user about network device 225, receive a plurality of responses from the user based on the questionnaire, generate a primary configuration file based on the plurality of responses, and transmit the primary configuration file to an installer device 205 associated with network device 225, where installer device 205 is configured to install the primary configuration file on network device 225.

In the example embodiment, installer device 205 is a computer that includes a web browser or a software application to enable installer devices 205 to communicate with NC computer device 210 and unconfigured network device 225. Installer device 205 is configured to access unconfigured network device 225 and install configuration information on unconfigured network device 225 to integrate unconfigured network device 225 onto network 100 as network device 116. More specifically, installer devices 205 are communicatively coupled to the Internet through many interfaces including, but not limited to, at least one of a network, such as a local area network (LAN), a wide area network (WAN), or an integrated services digital network (ISDN), a dial-up-connection, a digital subscriber line (DSL), a cellular phone connection, and a cable modem. Installer devices 205 can be any device capable of accessing the Internet and configuring unconfigured network devices 225 including, but not limited to, a desktop computer, a laptop computer, a personal digital assistant (PDA), a cellular phone, a smartphone, a tablet, a phablet, a gaming console, or other web-based connectable equipment.

In the example embodiment, NC computer device 210 is a networked computer device that includes a web browser or a software application to enable a user to answer basic configuration information about unconfigured network device 225 to generate configuration files for unconfigured network device 225. NC computer device 210 is communicatively coupled to the Internet through many interfaces including, but not limited to, at least one of a network, such as a local area network (LAN), a wide area network (WAN), or an integrated services digital network (ISDN), a dial-up-connection, a digital subscriber line (DSL), a cellular phone connection, and a cable modem. NC computer device 210 can be any device capable of accessing the Internet including, but not limited to, a desktop computer, a laptop computer, a personal digital assistant (PDA), a cellular phone, a smartphone, a tablet, a phablet, or other web-based connectable equipment.

In the example embodiment, unconfigured network devices 225 are similar to network device 116. In the example embodiment, unconfigured network devices 225 are set-up with default configurations and are unable to communicate with network 104 with these configurations. Examples of unconfigured network devices 225 include, but are not limited to, routers, cable modems, modems, hubs, and network switches. When properly configured unconfigured network devices 225 are capable of routing message traffic along or between networks, such as network 104, network 100, and/or the Internet.

A database server 215 is communicatively coupled to a database 220 that stores data. In one embodiment, database 220 includes configuration templates, questionnaires, network information, and configuration files. In the example embodiment, database 220 is stored remotely from NC computer device 210. In some embodiments, database 220 is decentralized. In the example embodiment, a person can access database 220 via installer device 205 by logging onto NC computer device 210, as described herein.

Figure 3:
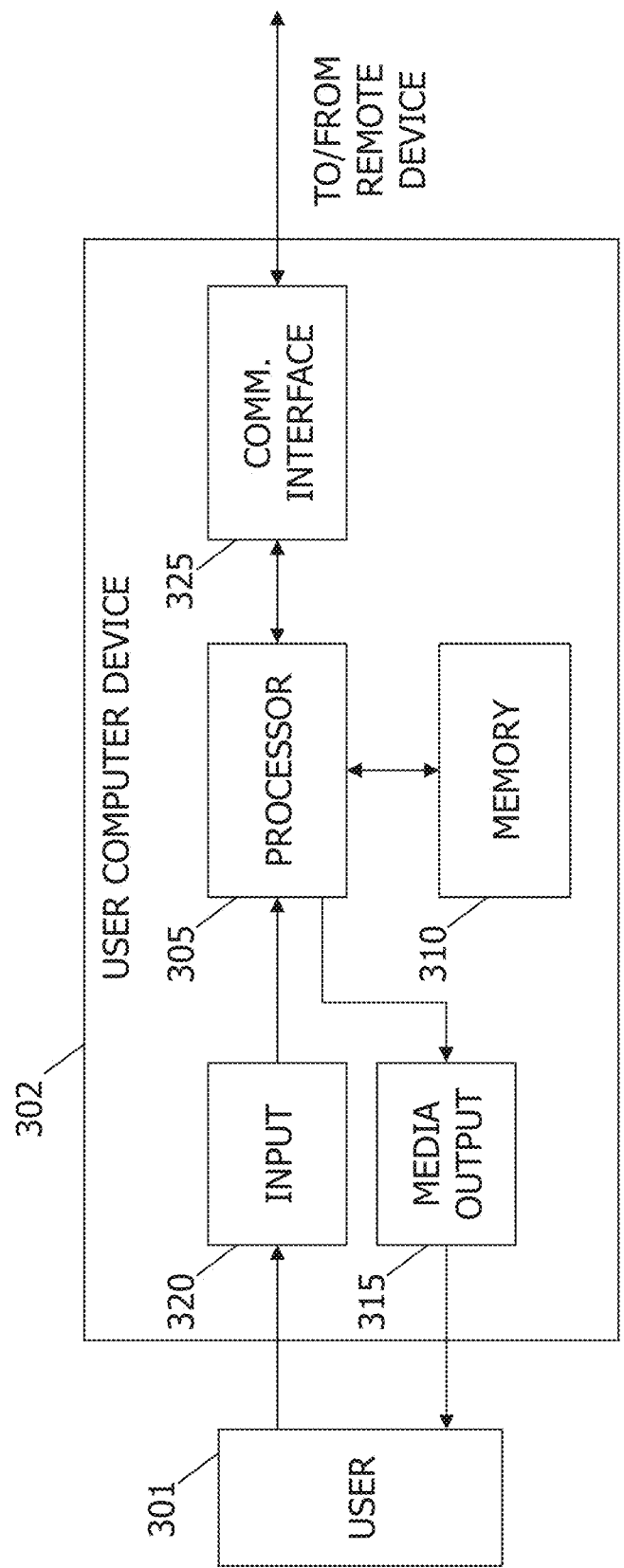

FIG. 3 illustrates an example configuration of a client system shown in FIG. 2, in accordance with one embodiment of the present disclosure. User computer device 302 is operated by a user 301. User computer device 302 may include, but is not limited to, installer device 205 and NC computer device 210 (both shown in FIG. 2). User computer device 302 includes a processor 305 for executing instructions. In some embodiments, executable instructions are stored in a memory area 310. Processor 305 may include one or more processing units (e.g., in a multi-core configuration). Memory area 310 is any device allowing information such as executable instructions and/or transaction data to be stored and retrieved. Memory area 310 may include one or more computer-readable media.

User computer device 302 also includes at least one media output component 315 for presenting information to user 301. Media output component 315 is any component capable of conveying information to user 301. In some embodiments, media output component 315 includes an output adapter (not shown) such as a video adapter and/or an audio adapter. An output adapter is operatively coupled to processor 305 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some embodiments, media output component 315 is configured to present a graphical user interface (e.g., a web browser and/or a client application) to user 301. A graphical user interface may include, for example, a configuration utility for configuring network devices 116 (shown in FIG. 1). In some embodiments, user computer device 302 includes an input device 320 for receiving input from user 301. User 301 may use input device 320 to, without limitation, select and/or enter one or more answers to a configuration questionnaire. Input device 320 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 315 and input device 320.

User computer device 302 may also include a communication interface 325, communicatively coupled to a remote device such as network device 116, unconfigured network device 225 (shown in FIG. 2), installer device 205, NC computer device 210, and central server system 102 (shown in FIG. 1). Communication interface 325 may include, for example, a wired or wireless network adapter and/or a wireless data transceiver for use with a mobile telecommunications network.

Stored in memory area 310 are, for example, computer-readable instructions for providing a user interface to user 301 via media output component 315 and, optionally, receiving and processing input from input device 320. The user interface may include, among other possibilities, a web browser and/or a client application. Web browsers enable users, such as user 301, to display and interact with media and other information typically embedded on a web page or a website. A client application allows user 301 to interact with, for example, unconfigured network device 225. For example, instructions may be stored by a cloud service and the output of the execution of the instructions sent to the media output component 315.

Figure 4:
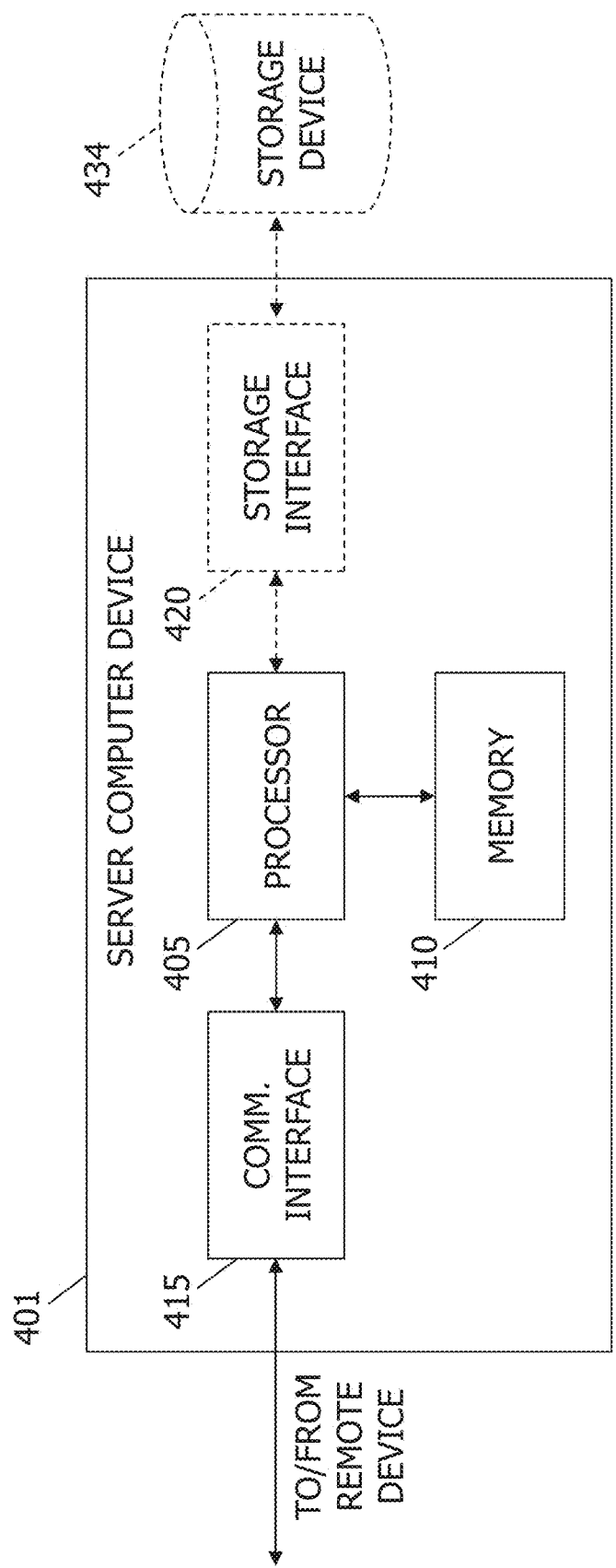

FIG. 4 illustrates an example configuration of a server system shown in FIG. 2, in accordance with one embodiment of the present disclosure. Server computer device 401 may include, but is not limited to, database server 215, NC computer device 210, installer device 205 (all shown in FIG. 2), and central server system 102 (shown in FIG. 1). Server computer device 401 also includes a processor 405 for executing instructions. Instructions may be stored in a memory area 410. Processor 405 may include one or more processing units (e.g., in a multi-core configuration).

Processor 405 is operatively coupled to a communication interface 415 such that server computer device 401 is capable of communicating with a remote device such as another server computer device 401, unconfigured network device 225 (shown in FIG. 2), NC computer device 210, installer device 205, and central server system 102. For example, communication interface 415 may receive requests from central server system 102 via the Internet.

Processor 405 may also be operatively coupled to a storage device 434. Storage device 434 is any computer-operated hardware suitable for storing and/or retrieving data, such as, but not limited to, data associated with database 220 (shown in FIG. 2). In some embodiments, storage device 434 is integrated in server computer device 401. For example, server computer device 401 may include one or more hard disk drives as storage device 434. In other embodiments, storage device 434 is external to server computer device 401 and may be accessed by a plurality of server computer devices 401. For example, storage device 434 may include a storage area network (SAN), a network attached storage (NAS) system, and/or multiple storage units such as hard disks and/or solid state disks in a redundant array of inexpensive disks (RAID) configuration.

In some embodiments, processor 405 is operatively coupled to storage device 434 via a storage interface 420. Storage interface 420 is any component capable of providing processor 405 with access to storage device 434. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 434.

Processor 405 executes computer-executable instructions for implementing aspects of the disclosure. In some embodiments, processor 405 is transformed into a special purpose microprocessor by executing computer-executable instructions or by otherwise being programmed. For example, processor 405 is programmed with the instructions such as are illustrated in FIG. 5.

Figure 5:
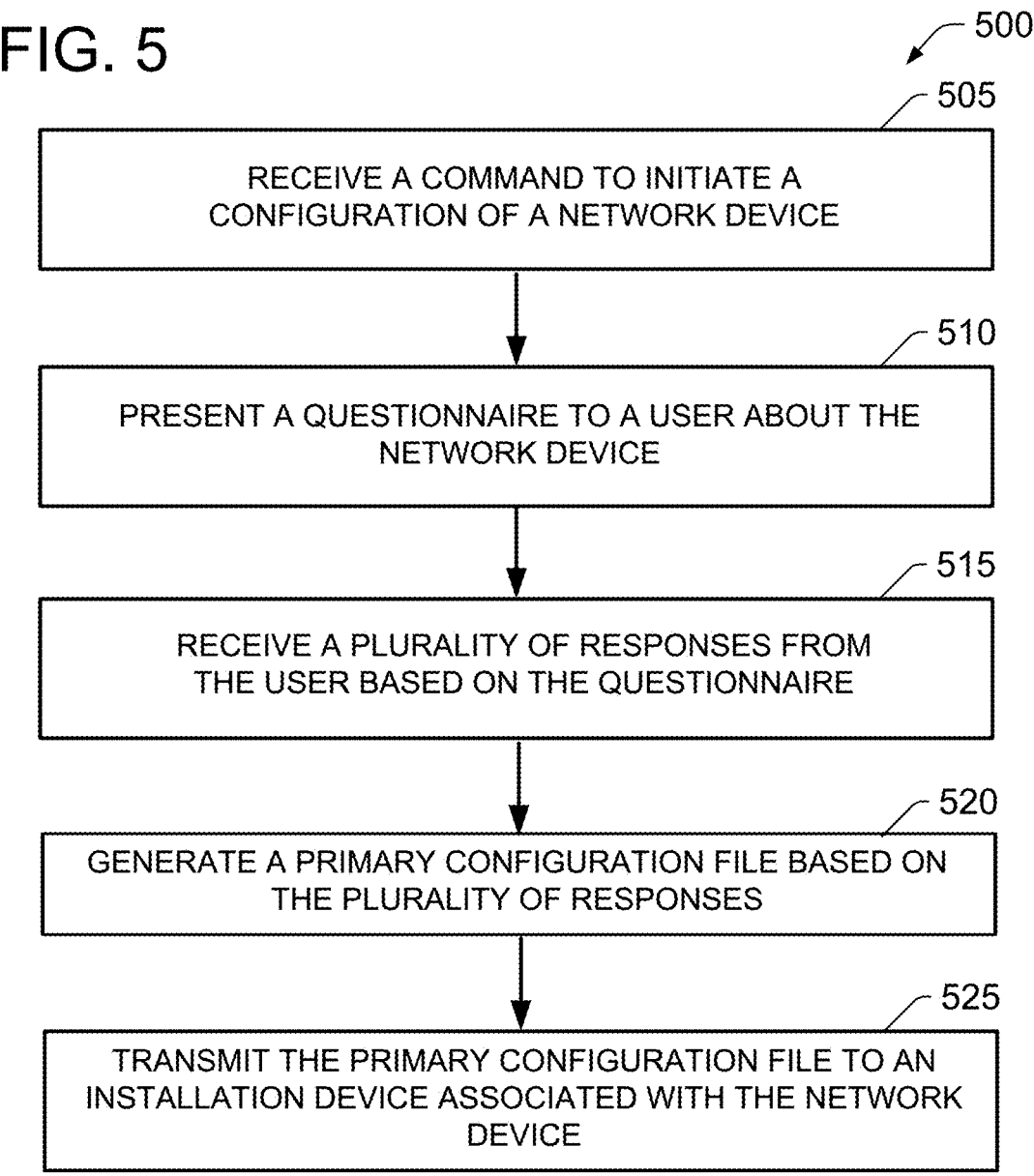

FIG. 5 is a flow chart of a process 500 for configuring one or more network devices 225 (shown in FIG. 2) for integration into network 100 (shown in FIG. 1) using system 200 shown in FIG. 2. In the example embodiment, process 500 is performed by NC computer device 210 (shown in FIG. 2).

In the example embodiment, NC computer device 210 receives 505 a command to initiate a configuration of an unconfigured network device 225. In some embodiments, network device 225 is configured for a first network and will be reconfigured for a second network in process 500. In the example embodiment, NC computer device 210 receives 505 the command from a user.

In the example embodiment, NC computer device 210 presents 510 a questionnaire to the user about the unconfigured network device 225. The questionnaire includes a plurality of questions about the potential configuration of network device 225. In the example embodiment, the questions are more targeted to general information about network 100 that network device will be a part of as it relates to the final location 106, 108, 110, and 112 (shown in FIG. 1) where unconfigured network device 225 will operate as network device 116 (shown in FIG. 1). Examples of questions include, but are not limited to, the final location for unconfigured network device 225, the type of device, which router of a plurality of routers the device will be at location 106, the network access provider, any addressing prefixes, bandwidth, VPN tunnel address, session description protocol (SDP), and other necessary network information. The purpose is to have the questions in the questionnaire be high level, so that the user does not have to be highly trained to answer the questionnaire. NC computer device 210 receives 515 a plurality of responses from the user based on the questions in the questionnaire.

The final location may include location within network 100, whether or not the device 225 will be a gateway, actual address of the final location of the device 225, physical location within a building, and any other location that will assist NC computer device 210 in determining the desired configuration for device 225. The type of device 225 may include, but is not limited to, the manufacturer, the make, the model, whether device 225 is a single or double router, the firmware version of device 225, and any other information that allows NC computer device 210 to identify the device from other similar devices. The questions may request the user to choose the position of device 225 in network 100 from a plurality of choices. The network access provider may include the vendor that will be providing network access to network 100 that device 225 will be connected to, such as, but not limited to, an Internet access provider. Examples of transport type include, but are not limited to T1, E1, point-to-point protocol (PPP), Ethernet, asynchronous transport mode (ATM), frame-relay, and very small aperture terminal (VSAT).

Based on the plurality of responses, NC computer device 210 generates 520 a primary configuration file. NC computer device 210 then transmits 525 the primary configuration file to installer device 205 (shown in FIG. 2). Installer device 205 is configured to use the primary configuration file to configure unconfigured network device 225 into network device 116.

In some embodiments, NC computer device 210 transmits part or all of the primary configuration file to central server system 102 (shown in FIG. 1). This transmission includes identification information for network device 116. Central server system 102 uses the primary configuration file to determine how to route message traffic to network device 116. For example, central server system 102 determines the bandwidth of network device 116 and routes network traffic accordingly to prevent overloading network device 116.

In some embodiments, NC computer device 210 stores a plurality of configuration information for a plurality of different network devices 116 at a plurality of locations 106, 108, 110, and 112. The plurality of configuration information includes a plurality of options for network devices 116 as well as network standard rules associated with network 100 or location 106, 108, 110, and 112. NC computer device 210 compares the plurality of responses to the questionnaire and the stored plurality of configuration information. NC computer device 210 generates the primary configuration file based on the comparison. In the example embodiment, the primary configuration file only includes a subset of the plurality of configuration information, where the subset is based on the configuration information necessary to set up an individual unconfigured network device 225.

In some embodiments, the plurality of configuration information is configured in a network configuration template, where NC computer device 210 converts the network configuration template into the primary configuration file based on the responses to the questionnaire. For example, NC computer device 210 may execute a script or program to present 510 the questionnaire to the user. As NC computer device 210 receives 515 the response from the user, NC computer device 210 generates 520 the primary configuration file.

In some embodiments, NC computer device 210 generates a secondary configuration file, where the secondary configuration file is an encryption configuration for network device 116. NC computer device 210 transmits the secondary configuration file to installer device 205 to use to configure unconfigured network device 225.

In some embodiments, NC computer device 210 is configured to generate a plurality of related primary configuration files for a plurality of unconfigured network devices 225. In some of these embodiments, NC computer device 210 presents a questionnaire for each network device. In other embodiments, NC computer device 210 presents a single questionnaire for the plurality of network devices. In these embodiments, NC computer device 210 transmits the primary configuration file associated with a network device to the corresponding installer device 205, where each installer device 205 may only be associated with a subset of the plurality of network devices.

Figure 6:
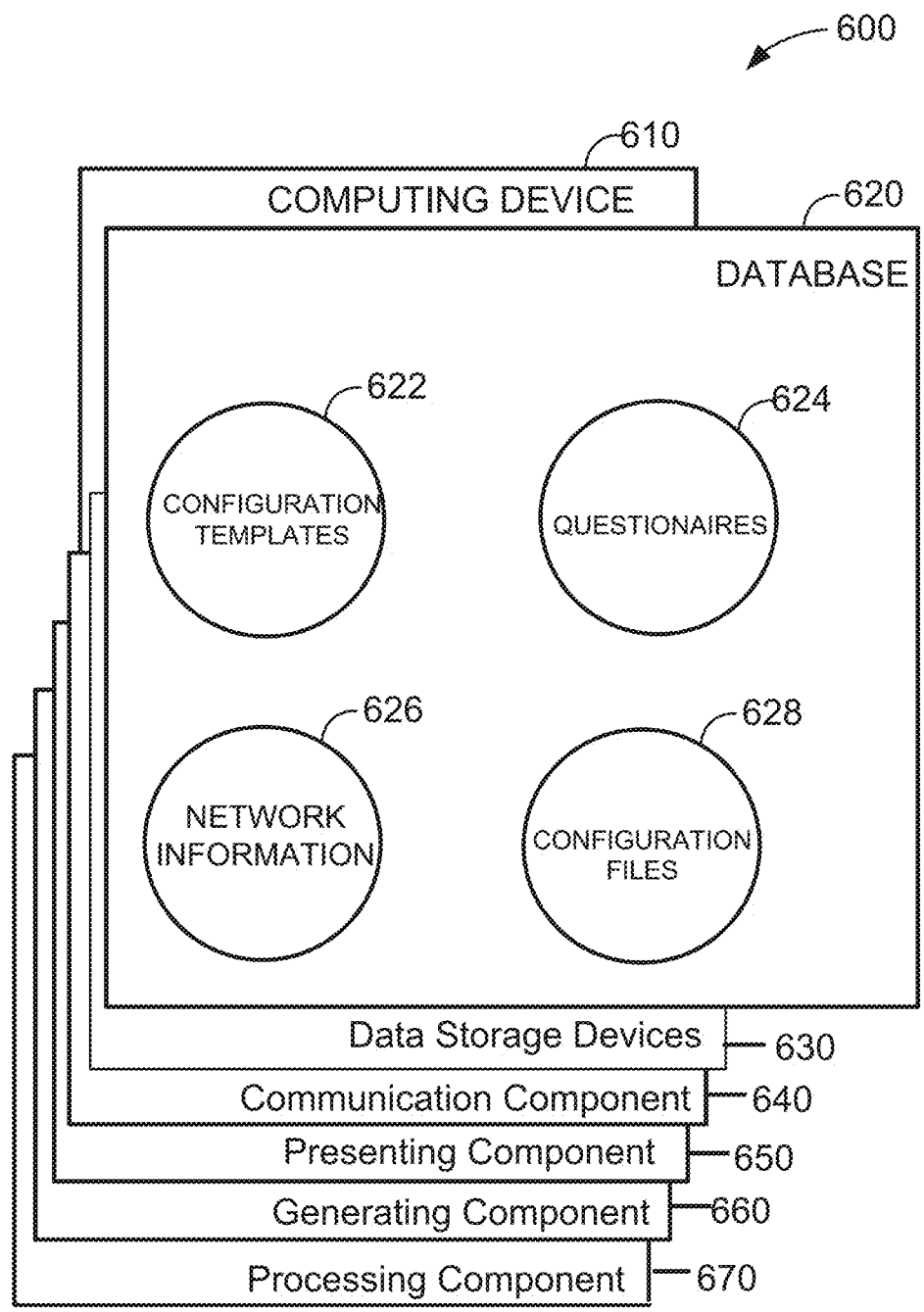

FIG. 6 is a diagram 600 of components of one or more example computing devices that may be used in network configuration system 200 shown in FIG. 2. In some embodiments, computing device 610 is similar to NC computer device 210 (shown in FIG. 2). Database 620 may be coupled with several separate components within computing device 610, which perform specific tasks. In this embodiment, database 620 includes configuration templates 622, questionnaires 624, network information 626, and configuration files 628. In some embodiments, database 620 is similar to database 220 (shown in FIG. 2).

Computing device 610 includes database 620, as well as data storage devices 630. Computing device 610 also includes a communication component 640 for receiving 505 a command to initiate a configuration of a network device, receiving 515 a plurality of responses, and transmitting 525 the primary configuration file (all shown in FIG. 5). Computing device 610 also includes a presenting component 650 for presenting 510 a questionnaire (shown in FIG. 5). Computing device 610 further includes a generating component 660 for generating 520 a primary configuration file (shown in FIG. 5). A processing component 670 assists with execution of computer-executable instructions associated with the system.

Figure 7:
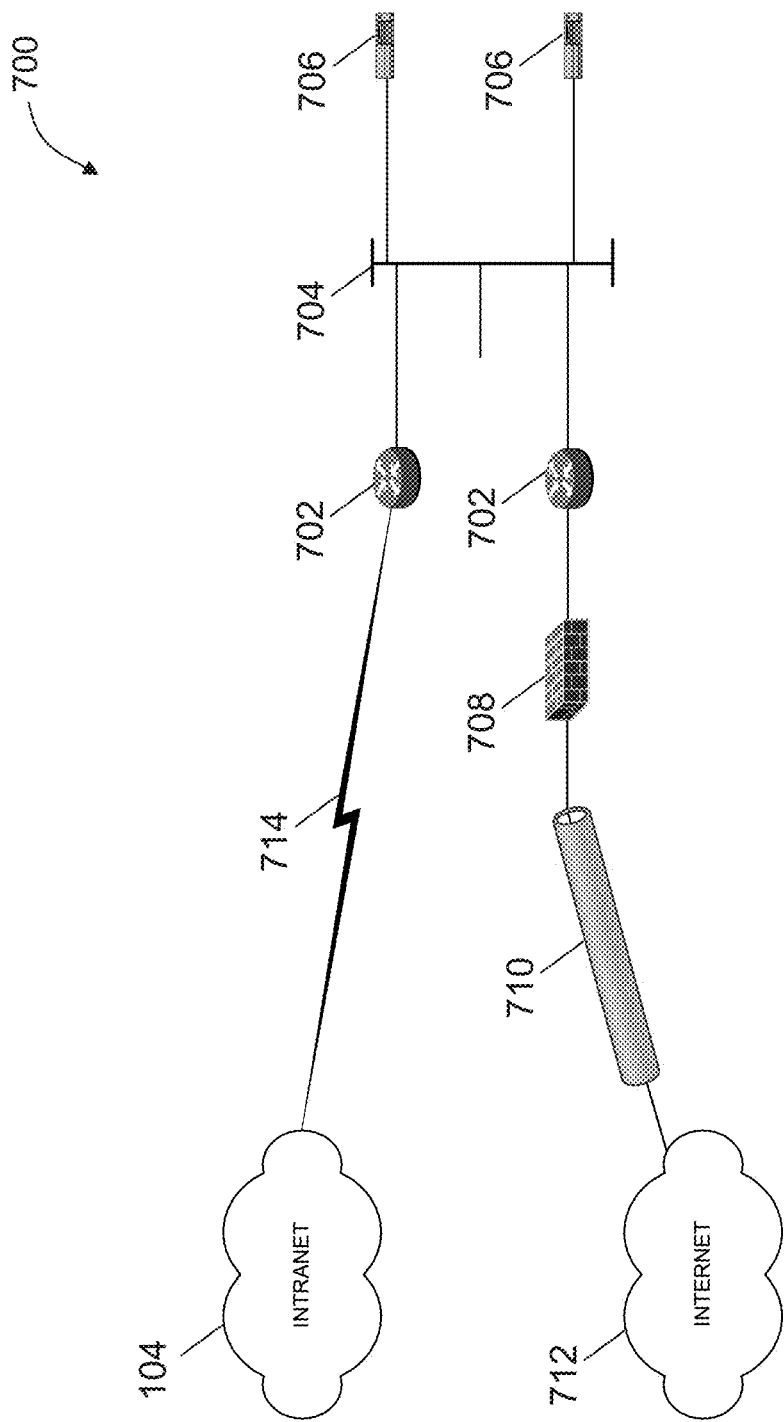

FIG. 7 is a schematic diagram illustrating an example dual router network 700 for WAN 100 (shown in FIG. 1). In the example embodiment, dual router network 700 includes two routers 702 and a switch 704. Switch 704 allows access to one or more servers 706.

One of the routers 702 connects to an internal network or Intranet 104 through a connection 714, such as a frame-relay connection. The other of the routers 702 connects to the Internet 712 through a firewall 708 and a connection 710, such as an Ethernet connection.

In the example embodiment, unconfigured network device 225 (shown in FIG. 2) may be any or all of the two routers 702 and the switch 704.

Figure 8:
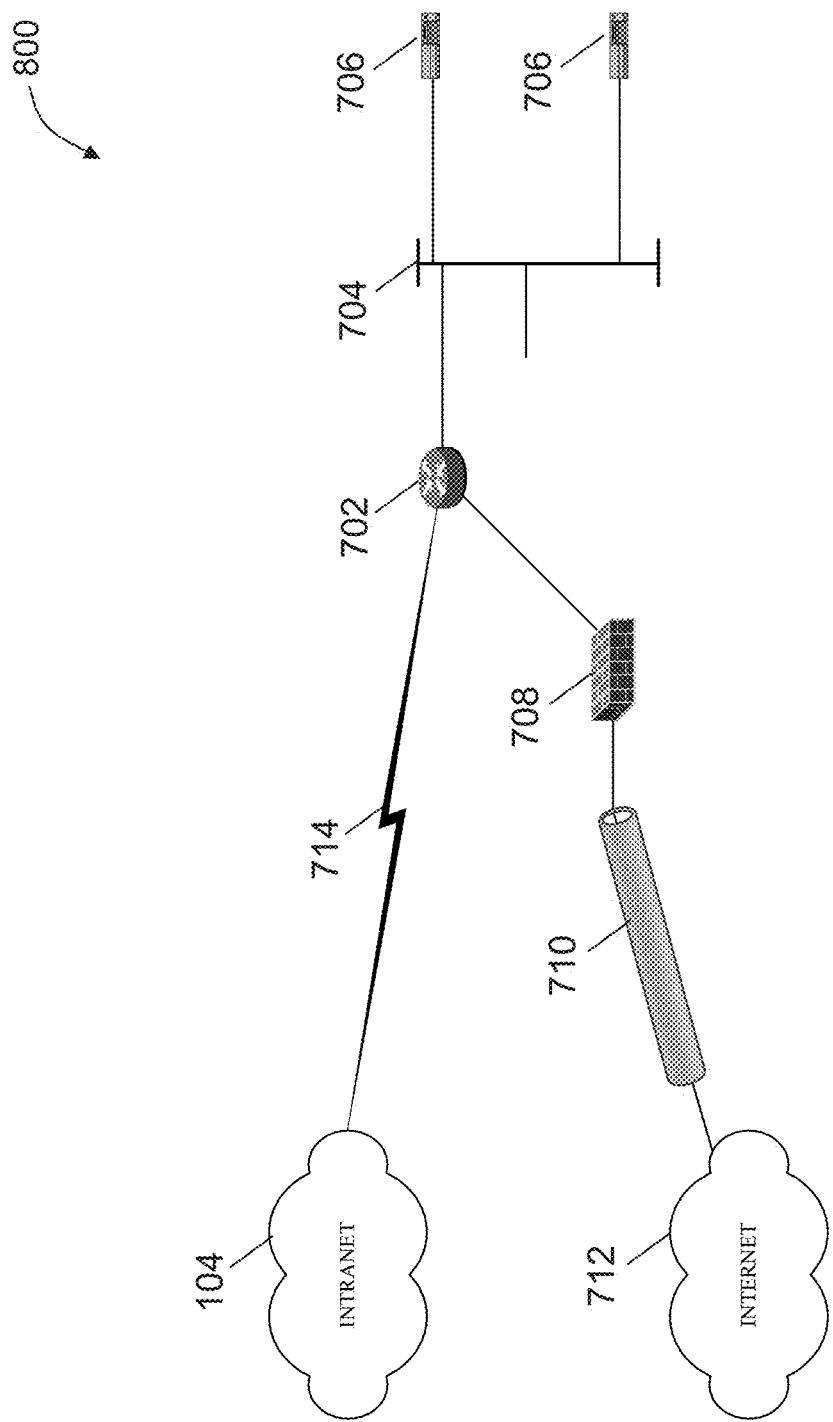

FIG. 8 is a schematic diagram illustrating an example single router network 800 for WAN 100 (shown in FIG. 1). In the example embodiment, single router network 800 includes a router 702 and a switch 704. Switch 704 allows access to one or more servers 706.

Router 702 connects to an internal network or Intranet 104 through a connection 714, such as a frame-relay connection. Router 702 also connects to the Internet 712 through a firewall 708 and a connection 710, such as an Ethernet connection.

In the example embodiment, unconfigured network device 225 (shown in FIG. 2) may be any or all of the router 702 and the switch 704.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure has been described in terms of various specific embodiments, those skilled in the art will recognize that the disclosure can be practiced with modification within the spirit and scope of the claims.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial locational differences from the literal language of the claims.

What is claimed is:

1. A network configuration (NC) computing device including a processor in communication with a memory, said processor configured to:
   receive a command to initiate a configuration of a network device in a wide area network (WAN), wherein the network device is to be configured to route traffic between the WAN and one or more computer devices;
   present a questionnaire to a user about the network device, wherein the questionnaire includes a plurality of questions about potential configurations of the network device in the WAN, wherein the plurality of questions request the user to identify the network device;
   receive a plurality of responses from the user based on the questionnaire;
   retrieve a network configuration template for the WAN;
   generate, by the processor of the NC computing device, a primary configuration file by combining the plurality of responses with the network configuration template for the WAN, wherein the primary configuration file comprises a plurality of configuration information for the network device in the WAN, wherein the plurality of configuration information includes at least one communication protocol for communicating with the WAN; and
   transmit, from the NC computing device, the primary configuration file to an installer device in communication with the network device, wherein the installer device configures the network device for communication on the WAN using the primary configuration file, wherein the network device is to be configured to route traffic between the WAN and one or more computer devices, and wherein the network device, the NC computing device, and the installer device are three separate devices.

2. The NC computing device in accordance with claim 1, wherein said processor is further configured to transmit the primary configuration file to a central server system including identification information for the network device corresponding to the primary configuration file.

3. The NC computing device in accordance with claim 2, wherein the central server system is configured to transmit message traffic to the network device based on the primary configuration file.

4. The NC computing device in accordance with claim 1, wherein said processor is further configured to:
   store a plurality of configuration information for a plurality of network devices, wherein the plurality of configuration information includes a plurality of options and a plurality of network standard rules, and wherein the plurality of configuration information further includes a final location for the network device; and
   generate the primary configuration file based on the plurality of responses to the questionnaire and the stored plurality of configuration information.

5. The NC computing device in accordance with claim 4, wherein said processor is configured to compare the plurality of responses to the plurality of configuration information to determine the configuration for the network device.

6. The NC computing device in accordance with claim 4, wherein the plurality of configuration information includes the network configuration template, and wherein said processor is configured to apply the plurality of responses to the questionnaire to the network configuration template to generate the primary configuration file, wherein the primary configuration file includes a subset of the configuration information included in the network configuration template.

7. The NC computing device in accordance with claim 1, wherein the processor is further configured to generate a secondary configuration file for the network device based on the primary configuration file, wherein the secondary configuration file includes an encryption configuration.

8. The NC computing device in accordance with claim 1, wherein the network device includes at least one of a router and a network switch.

9. The NC computing device in accordance with claim 1, wherein the processor is further configured to generate a plurality of different configuration files for a plurality of network devices by combining the plurality of responses with the network configuration template for the WAN.

10. The NC computing device in accordance with claim 1, wherein the network device includes one of a router, a cable modem, a modem, a hub, and a network switch.

11. A computer-based method for configuring network devices, said method implemented using a network configuration (NC) computer device in communication with a memory, said method comprising:
   receiving, at first computer device, a command to initiate a configuration of a second device in a wide area network (WAN), wherein the first computer device is the NC computer device, and wherein the second device is a network device;
   presenting, by the first computer device, a questionnaire to a user about the second device, wherein the questionnaire includes a plurality of questions about potential configurations of the second device in the WAN, wherein the plurality of questions request the user to identify the second device;
   receiving, at the first computer device, a plurality of responses from the user based on the questionnaire;
   retrieving a network configuration template for the WAN;
   generating, by the first computer device, a primary configuration file by combining the plurality of responses with the network configuration template for the WAN, wherein the primary configuration file comprises a plurality of configuration information for the second device in the WAN, wherein the plurality of configuration information includes at least one communication protocol for communicating with the WAN; and
   transmitting, by the first computer device, the primary configuration file to third device in communication with the second device, wherein the third device configures the second device for communication on the WAN using the primary configuration file, wherein the third device is an installer device, and wherein the network device, the NC computer device, and the installer device are separate devices.

12. The method in accordance with claim 11 further comprising transmitting the primary configuration file to a central server system including identification information for the network device corresponding to the primary configuration file.

13. The method in accordance with claim 12, wherein the central server system is configured to transmit message traffic to the network device based on the primary configuration file.

14. The method in accordance with claim 11 further comprising:
   storing a plurality of configuration information for a plurality of network devices, wherein the plurality of configuration information includes a plurality of options and a plurality of network standard rules, and wherein the plurality of configuration information further includes a final location for the network device; and
   generating the primary configuration file based on the plurality of responses to the questionnaire and the stored plurality of configuration information.

15. The method in accordance with claim 14, wherein the plurality of configuration information includes the network configuration template, and wherein the method further comprises applying the plurality of responses to the questionnaire to the network configuration template to generate the primary configuration file, wherein the primary configuration file includes a subset of the configuration information included in the network configuration template.

16. The method in accordance with claim 11 further comprising generating a secondary configuration file for the network device based on the primary configuration file, wherein the secondary configuration file includes an encryption configuration.

17. A non-transitory computer-readable storage media having computer-executable instructions embodied thereon, wherein when executed by a network configuration (NC) computer device having at least one processor coupled to at least one memory device, the computer-executable instructions cause the processor to:
   receive a command to initiate a configuration of a network device in a wide area network (WAN), wherein the network device is to be configured to route traffic between the WAN and one or more computer devices;
   present a questionnaire to a user about the network device, wherein the questionnaire includes a plurality of questions about potential configurations of the network device in the WAN, wherein the plurality of questions request the user to identify the network device;
   receive a plurality of responses from the user based on the questionnaire;
   retrieve a network configuration template for the WAN;
   generate, by the NC computing device, a primary configuration file by combining the plurality of responses with the network configuration template for the WAN, wherein the primary configuration file comprises a plurality of configuration information for the network device in the WAN, wherein the plurality of configuration information includes at least one communication protocol for communicating with the WAN; and
   transmit, from the NC computing device, the primary configuration file to an installer device in communication with the network device, wherein the installer device configures the network device for communication on the WAN using the primary configuration file, wherein the network device is to be configured to route traffic between the WAN and one or more computer devices, and wherein the network device, the NC computing device, and the installer device are three separate devices.

18. The computer-readable storage media in accordance with claim 17, wherein the computer-executable instructions further cause the processor to transmit the primary configuration file to a central server system including identification information for the network device corresponding to the primary configuration file.

19. The computer-readable storage media in accordance with claim 17, wherein the computer-executable instructions further cause the processor to:
   store a plurality of configuration information for a plurality of network devices, wherein the plurality of configuration information includes a plurality of options and a plurality of network standard rules, and wherein the plurality of configuration information further includes a final location for the network device; and
   generate the primary configuration file based on the plurality of responses to the questionnaire and the stored plurality of configuration information.

20. The computer-readable storage media in accordance with claim 19, wherein the plurality of configuration information includes the network configuration template, and wherein the computer-executable instructions further cause the processor to apply the plurality of responses to the questionnaire to the network configuration template to generate the primary configuration file, wherein the primary configuration file includes a subset of the configuration information included in the network configuration template.

* * * * *